United States Patent [19]

Fahrbach et al.

[11] 4,086,298
[45] Apr. 25, 1978

[54] BRANCHED BLOCK COPOLYMERS AND THEIR MANUFACTURE

[75] Inventors: Gerhard Fahrbach, Plankstadt; Karl Gerberding; Erhard Seiler, both of Ludwigshafen; Dieter Stein, Limburgerhof, all of Germany

[73] Assignee: BASF Aktiengesellschaft, Ludwigshafen, Germany

[21] Appl. No.: 732,890

[22] Filed: Oct. 15, 1976

[30] Foreign Application Priority Data

Nov. 8, 1975 Germany .................... 2550226

[51] Int. Cl.² .................................... C08F 297/04
[52] U.S. Cl. ........................................... 260/880 B
[58] Field of Search ................................. 260/880 B

[56] References Cited
U.S. PATENT DOCUMENTS

| | | | |
|---|---|---|---|
| 3,281,383 | 10/1966 | Zelinski | 260/880 B |
| 3,637,554 | 1/1972 | Childers | 260/880 B |
| 3,639,517 | 2/1972 | Kitchen | 260/880 B |
| 3,639,521 | 2/1972 | Hsieh | 260/880 B |
| 3,644,588 | 2/1972 | Hassell | 260/880 B |
| 3,947,536 | 3/1976 | Horiie | 260/880 B |
| 3,985,830 | 10/1976 | Fetters | 260/880 B |

OTHER PUBLICATIONS

D. C. Allport, "Block Copolymers", John Wiley & Sons, New York, 1973, pp. 81–85.

*Primary Examiner*—Paul R. Michl
*Attorney, Agent, or Firm*—Keil, Thompson & Shurtleff

[57] ABSTRACT

Branched block copolymers of from 60 to 95 percent by weight of a monovinyl-aromatic compound and from 40 to 5 percent by weight of a conjugated diene. The copolymers have a structure of the general formula

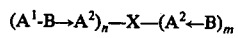

$$(A^1\text{-}B\rightarrow A^2)_n\text{—}X\text{—}(A^2\leftarrow B)_m$$

where the A's are non-elastomeric polymer segments based on the monovinyl-aromatic compound, the B's are elastomeric polymer segments based on the conjugated diene, X is the radical of an at least trifunctional coupling agent and n and m are numbers. The copolymers may be used for the manufacture of highly transparent impact-resistant shaped articles, especially packaging materials.

10 Claims, No Drawings

BRANCHED BLOCK COPOLYMERS AND THEIR MANUFACTURE

The present invention relates to branched block copolymers which are built up of a predominant proportion of a monovinylaromatic compound and a lesser proportion of a conjugated diene, and which possess high transparency, high clarity and good mechanical properties, especially a high impact strength.

The manufacture, by polymerization of styrene and butadiene with lithium-hydrocarbons as initiators, of block copolymers in which one or more non-elastomeric polymer blocks are bonded to one or more elastomeric polymer blocks, has been disclosed. Depending on the content of the polymer blocks in the total polymer, these thermoplastic block copolymers exhibit non-elastomeric or elastomeric properties. Successive polymerization of the monomers results in block copolymers having a linear structure. If such linear block copolymers are coupled to one another by polyfunctional reactive compounds, branched block copolymers having a star-shaped structure result. Such branched block copolymers, described, for example, in British Pat. No. 985,614, have a symmetrical structure and in general exhibit better processability than the linear block copolymers.

It has also been disclosed that styrene-butadiene block copolymers having a high styrene content are clear thermoplastics having a high impact strength. Even though the block copolymers of this type, developed and proposed hitherto, have satisfactory properties in some respects, there are many practical requirements which they do not fulfil. In particular, their physical and mechanical properties leave something to be desired, or the products do not possess the transparency which is desirable for many applications.

German Laid-Open Application DOS 1,959,922 discloses branched copolymers having a star-shaped structure, obtained from a predominant proportion of styrene and a lesser proportion of a conjugated diene, which are stated to combine impact strength, clarity, good processability and resistance to external factors, in one and the same polymer. These branched block copolymers are obtained by coupling styrene-diene two-block copolymers in which the terminal polystyrene blocks have different lengths.

It is true that these products exhibit improved properties compared to the symmetrically branched block copolymers, but they do not prove fully satisfactory in respect of their mechanical properties, especially their impact strength, elongation at break and yield stress.

Unsymmetrical branched block copolymers are also described in German Laid-Open Application DOS 2,125,344. The advantage of these copolymers, which possess a homopolymer block in at least one branch, over symmetrical block copolymers is stated to be the lower solution viscosity of the polymers. In respect of their mechanical properties (impact strength), the polymers described in DOS 2,125,344, if based on a predominant proportion of styrene, are as unsatisfactory as the products known from DOS 1,959,922.

It is an object of the present invention to improve the mechanical properties of styrene-butadiene block copolymers which comprise a predominant proportion of styrene, and in particular to provide products having an increased impact strength and improved elongation at break. In addition, the products should be transparent and as glass-clear as possible, and should possess good processability.

We have found that this object is achieved and that, surprisingly, non-elastomeric branched block copolymers of a monovinylaromatic compound and a conjugated diene possessing a quite specific block composition and structure in the branches, exhibit improved properties relative to comparable conventional block copolymers.

Accordingly, the present invention relates to branched block copolymers of from 60 to 95 percent by weight of a monovinyl-aromatic compound and from 40 to 5 percent by weight of a conjugated diene of 4 to 8 carbon atoms, which are built up of non-elastomeric polymer segments based on the monovinyl-aromatic compound and elastomeric polymer segments based on the conjugated diene and which are manufactured by anionic solution polymerization of the monomers by means of a monolithium-hydrocarbon as the initiator, followed by coupling of the resulting linear block copolymer with a polyfunctional coupling agent, wherein the average structure of the branched block copolymers corresponds to the general formula

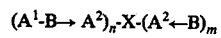

$$(A^1\text{-}B\rightarrow A^2)_n\text{-}X\text{-}(A^2\leftarrow B)_m$$

where $A^1$ and $A^2$ are non-elastomeric polymer segments based on the monovinyl-aromatic compound and the B's are elastomeric polymer segments based on the conjugated diene, $n$ and $m$ are numbers, $m$ being equal to or greater than $n$ and the sum of $m$ and $n$ being at least 3, and X is the radical of the polyfunctional coupling agent by means of which the polymer blocks, which form the branches, are chemically bonded to one another at the polymer segments $A^2$, with the provisos that the polymer segment or segments $A^1$ contains or contain from 50 to 80 percent by weight of the total monovinyl-aromatic compound of the branched block copolymer, as copolymerized units, the transition between the polymer segments $A^1$ and B is sharp and the transition between the polymer segments B and $A^2$ is gradual.

Examples of monovinyl-aromatic compounds which can be used to synthesize the branched block copolymers of the invention are styrene, styrenes which are alkylated in the side chain, eg. α-methylstyrene and nuclear-substituted styrenes, eg. vinyltoluene or ethylvinylbenzene. The monovinyl-aromatic compounds may be employed individually or as mixtures with one another. Preferably, however, styrene alone is used. Examples of conjugated dienes which can be employed according to the invention, individually or as mixtures with one another, for the manufacture of the branched block copolymers, are butadiene, isoprene and 2,3-dimethylbutadiene. Butadiene and isoprene give particularly advantageous results, and of the two butadiene is preferred.

The branched block copolymers of the invention should in total contain from 60 to 95 percent by weight, especially from 70 to 90 percent by weight, of the monovinyl-aromatic compound and from 40 to 5 percent by weight, preferably from 30 to 10 percent by weight of the conjugated diene (in each case based on the total monomers employed), as copolymerized units. The molecular weight of the branched block copolymers is as a rule from 100,000 to 1,000,000 and preferably from 150,000 to 500,000. These figures relate to the weight average molecular weight, determined by viscosity measurements in toluene at 25° C.

In detail, the branched block copolymers of the invention are manufactured by successive polymerization of the monomers in solution in the presence of a monolithium-hydrocarbon as the initiator, with stepwise addition of monomer and of initiator, followed by coupling of the resulting living linear block copolymers with a polyfunctional reactive compound as the coupling agent, as follows:

In a first process stage, the non-elastomeric polymer segment $A^1$ is produced by polymerizing a substantial portion of the total amount of the monovinyl-aromatic compound by means of a relatively small amount of the monolithium-hydrocarbon initiator in an inert solvent under conventional conditions. In this stage, from 50 to 80 percent by weight, preferably from 60 to 78 percent by weight, of the total amount of the monovinyl-aromatic compound employed, overall, for the manufacture of the branched block copolymers should be used. The total amount of monovinyl-aromatic compound used for the manufacture of the branched block copolymers is from 60 to 95 percent by weight, in particular from 70 to 90 percent by weight, based on the total monomers used for the manufacture of the polymer.

The amount of the initiator employed in the first stage of the process depends, above all, on the desired molecular weight of the polymer and is generally from 0.2 to 10 mmoles per mole of the monovinyl-aromatic compounds employed in the said first process stage. Preferably, from 0.4 to 2.5 mmoles of initiator per mole of the monovinyl-aromatic compounds employed in the first process stage are used in the said stage. The initiators employed are the conventional monolithium-hydrocarbons of the general formula RLi, where R is an aliphatic, cycloaliphatic, aromatic or mixed aliphatic-aromatic hydrocarbon radical, which may be of 1 to about 12 carbon atoms. Examples of the lithium-hydrocarbon initiators to be employed according to the invention are methyl-lithium, ethyl-lithium, n-, sec.- and tert.-butyl-lithium, isopropyl-lithium, cyclohexyl-lithium, phenyl-lithium and p-tolyl-lithium. The monolithium-alkyl compounds where alkyl is of 2 to 6 carbon atoms are preferred, n-butyl-lithium and sec.-butyl-lithium being particularly preferred.

The polymerization of the monovinyl-aromatic compounds is carried out in solution in an inert organic hydrocarbon solvent. Suitable hydrocarbon solvents are aliphatic, cycloaliphatic and aromatic hydrocarbons which are liquid under the reaction conditions and are preferably of 4 to 12 carbon atoms. Examples are isobutane, n-pentane, isooctane, cyclopentane, cyclohexane, cycloheptane, benzene, toluene, the xylenes and others. Mixtures of these solvents may also be employed. Furthermore, the polymerization can be carried out in the presence of small amounts, in general from $10^{-3}$ to 5 percent by weight, based on total solvents, of ethers, eg. tetrahydrofuran, dimethoxyethane, phenyl methyl ether and others, whereby it is possible to influence, in the conventional manner, the rate of polymerization, the configuration of the butadiene polymer segment B and the statistical transition between the segments B and $A^2$. Preferably, however, no ether is added. The concentration of the monomers in the reaction solution is not critical and can be so chosen that any desired apparatus can be used for the polymerization. As a rule, the polymerization is carried out in from 10 to 30% strength solutions in the inert solvents.

The polymerization is carried out under the conventional conditions for anionic polymerizations with lithium-organic compounds, eg. in an inert gas atmosphere, with exclusion of air and moisture. The polymerization temperature may, for example, be from 0° to 120° C and is preferably kept at from 40° to 80° C.

In this first stage of the process, the polymerization is taken to virtually complete conversion of the monovinylaromatic compounds employed. This gives a solution of non-elastomeric, living linear polymers of the monovinyl-aromatic compounds (polymer segment $A^1$) with active terminal lithium-carbon bonds capable of further addition of monomers.

In the second stage of the process, the polymer segments B, followed by the polymer segments $A^2$, are polymerized onto the living active chain ends of these polymer segments $A^1$, to form the polymer block ($A^1$—B→$A^2$) of the branched structure, and at the same time, in the same reactor, the copolymer blocks (B→$A^2$) of the branched structure are formed. For this purpose, a further amount of initiator and a mixture of the remaining monovinyl-aromatic compound and the conjugated diene are added to the fully polymerized reaction solution from the first stage of the process, and polymerization is carried out. The amount of conjugated diene is from 5 to 40 percent by weight, preferably from 10 to 30 percent by weight, of the total monomers employed for the manufacture of the branched block copolymers of the invention. The amount of fresh initiator which is added to the reaction solution in the second stage of the process should be as great or greater, than the original amount of initiator which has been employed in the first stage of the polymerization process. Preferably, the amount of fresh initiator added in the second stage of the process is from 1 to 15 times, and in particular from 1 to 10 times, the amount of initiator added originally. It is particularly advantageous to add from 1 to 5 times the amount, especially when, as explained in more detail below, trifunctional or tetrafunctional coupling agents are employed in the subsequent coupling reaction. Suitable initiators are the monolithium-hydrocarbons, which can also be employed in the first stage of the process; preferably, the initiator used is identical to that used in the first stage of the process. It is advantageous to add the fresh initiator to the reaction solution before the monomer mixture of the remaining monovinyl-aromatic compound and the conjugated diene is added.

In the second process stage, the same polymerization conditions may be maintained as in the first stage, and here again polymerization is taken to virtually complete conversion of the monomers. In this polymerization, the monomers added in the second stage of the process are added onto the active living chain ends of the previously formed monomer segments $A^1$, but new chains of living polymers are also formed by the fresh initiator added. Because of the different copolymerization parameters, the conjugated dienes polymerize substantially more rapidly than the monovinyl-aromatic compounds, so that after addition of the monomer mixture in the second stage of the process, it is first predominantly the conjugated dienes which undergo polymerization, and only occasional polymerized units of the monovinyl-aromatic compounds are formed. Only toward the end of the diene polymerization, ie. when almost all the conjugated diene has polymerized, does the polymerization of the monovinyl-aromatic compounds commence to a significant degree, so that the predominant proportion — as a rule more than 70 percent by weight, and in most cases up to 80 percent by weight — of the monovinyl-aromatic compounds contained in the monomer mixture only polymerizes after the conjugated diene has been consumed.

Accordingly, in the second stage of the process an elastomeric polymer segment B, based on the conjugated dienes, is first formed, this being a copolymer of a predominant proportion of the conjugation diene with small amounts of the monovinyl-aromatic compound, after which a non-elastomeric polymer segment $A^2$ is formed, which is made up of the monovinyl-aromatic compounds only. Since the proportion of the monovinyl-aromatic compounds progressively increases toward the end of the polymer segment B and the proportion of the conjugated diene correspondingly decreases, the transition between the polymer segments B and $A^2$ formed is not sharp and instread occurs gradually; this is therefore frequently described as a blurred transition between the segments. This fact is taken into account, in the general formula for the branched block copolymers of the invention, by the use of the symbol →.

After complete polymerization of the monomer mixture in the second stage of the process, the reaction solution thus contains a mixture of living linear block copolymers of the type $(A^1—B\rightarrow A^2)$—Li and $(B\rightarrow A^2)$—Li, each with reactive lithium-carbon bonds at the free end of the polymer segments $A^2$. The ratio of the two types of block copolymers in the reaction solution corresponds to the ratio of the amounts of initiator in the first and second stages of the process.

The mixture of these two types of active living linear block copolymers is then reacted in a further stage of the process, in which is added a polyfunctional reactive compound to act as the coupling agent. The polyfunctional coupling agent used should be at least trifunctional, ie. it should be capable of reacting with three or more of the active living block copolymer chains, at the terminal lithium-carbon bonds of these, to form a chemical bond, so that a single coupled and accordingly branched block copolymer is formed. The coupling of lithium-terminated living polymers with polyfunctional coupling agents is known in the art and disclosed, for example, in the publications cited initially, especially British Pat. No. 985,614.

Examples of suitable coupling agents for the manufacture of the branched block copolymers of the invention are polyepoxides, eg. epoxidized linseed oil, polyisocyanates, eg. benzo-1,2,4-triisocyanate, polyketones, eg. 1,3,6-hexanetrione or 1,4,9,10-anthracenetetrone, polyanhydrides, eg. the dianhydride of pyromellitic acid, or polyhalides. Dicarboxylic acid esters, eg. diethyl adipate or the like, can equally be used as coupling agents. A further preferred group of coupling agents comprises the silicon halides, especially silicon tetrachloride, silicon tetrabromide, trichloroethylsilane or 1,2-bis(methyldichlorosilyl)-ethane. Further coupling agents which can be employed are polyvinyl-aromatics, especially divinylbenzene, as described, eg., in U.S. Pat. No. 3,280,084. In this case, some divinylbenzene units add on, producing crosslinking and forming a branching center, through which the preformed polymer blocks are bonded to one another.

The nature of the polyfunctional coupling agent used is not critical provided it does not significantly detract from the desired properties of the end product. The use of a trifunctional or tetrafunctional coupling agent of the above type, or of divinylbenzene, is preferred. In general, the polyfunctional coupling agent is added to the reaction solution in amounts equivalent to the total amount of the "living" polymer blocks, ie. equivalent to the number of active lithium-carbon bonds in the preformed linear block copolymers. The reaction of the living linear block copolymers with the coupling agent is preferably carried out under the same reaction conditions as the preceding polymerization of the monomers. The resulting branched block copolymers are isolated from the reaction solution by conventional methods, eg. by precipitating the polymer from the reaction solution, and filtering it off.

If desired, the branched block copolymer can be hydrogenated following the coupling reaction and, advantageously, before isolating the product from the reaction solution. The hydrogenation may be carried out selectively or non-selectively and is normally effected with the aid of molecular hydrogen and catalysts based on metals, or salts of metals, of group 8 of the periodic table. The hydrogenation can be carried out in a homogeneous phase with catalysts based on salts, especially the carboxylates, alkoxides or enolates of cobalt, nickel or iron, which have been reduced with metal alkyls, especially aluminum alkyls, as disclosed, for example, in U.S. Pat. No. 3,113,986, German Published Application DAS 1,222,260 or German Laid-Open Application DOS 2,013,263. In these reactions, the olefinic double bonds are hydrogenated under mild conditions at hydrogen pressures of from 1 to 100 bars, and at from 25° to 150° C. The hydrogenation can also be carried out in a heterogeneous phase, with metallic nickel or metals of the platinum group as catalysts, at hydrogen pressures of from 20 to 300 bars and at from 40 to 300 bars and at from 40° to 300° C (for example, by the method of German Published Application DAS 1,106,961 or German Laid-Open Application DOS 1,595,345). In this reaction, not only the olefinic double bonds but also the aromatic double bonds are hydrogenated. If the hydrogenation is carried out in solution, it is advantageously effected in the same solvent as the preceding polymerization. The branched block copolymer may be hydrogenated partially or completely. If a hydrogenation is carried out, it is preferred selectively to hydrogenate the olefinic double bonds of the polymer, so that the hydrogenated branched copolymers obtained preferably only contain less than 10% and especially less than 3%, of olefinic double bonds. The hydrogenation is preferably carried out on branched block copolymers which have been manufactured in the presence of small amounts of ethers during the polymerization.

The process of manufacture decides the composition and structure of the branched block copolymers of the invention. If, for example, a tetrafunctional coupling agent is used and the ratio, in the fully polymerized reaction solution from the second stage of the process, of the two types of block copolymers which form the branches, namely the ratio of $(A^1—B\rightarrow A^2)$—Li to $(B\rightarrow A^2)$—Li, is, for example, 1:1 or 1:3, the resulting branched block copolymer will on average (most probable structure) possess a structure of the formula

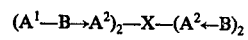

or $$(A^1-B\to A^2)_1-X-(A^2\leftarrow B)_3.$$

In the case of a trifunctional coupling agent and a ratio of the two types of branches, namely $(A^1-B\to A^2)$—Li to $(B\leftarrow A^2)$—Li, of 1:2, the most probable average structure of the branched block copolymer is $$(A^1-B\to A^2)_1-X-(A^2\leftarrow B)_2;$$

in each of the formulae, X is the radical of the coupling agent.

In general, the most probable average structure of the branched block copolymers manufactured according to the invention corresponds to the general formula $$(A^1-B\to A^2)_n-X-(A^2\leftarrow B)_m$$

where $m$ and $n$ are integers, and the sum of $n$ and $m$ is equal to the polyfunctionality of the coupling component and is thus at least 3, in general from 3 to 10 and preferably 3 or 4. $m$ is equal to or greater than $n$. The non-elastomeric polymer segment $A^1$, which contains from 50 to 80 percent by weight, preferably from 60 to 78 percent by weight, of the total monovinyl-aromatic compound, employed for the manufacture of the branched block copolymer, as polymerized units, preferably consists only of the monovinylaromatic compounds and is thus in particular a homopolystyrene segment. Its molecular weight depends particularly on the envisaged end use of the final product and is preferably from 50,000 to 250,000. As stated, the elastomeric polymer segment B is a copolymer block consisting essentially of the conjugated diene with a small proportion of monovinyl-aromatic compound, and in particular the olefinic double bonds can be selectively hydrogenated. The proportion of monovinyl-aromatic compound in the polymer segment B is in general less than about 30 percent by weight and in particular less than about 20 percent by weight, based on the amount of vinyl-aromatic not contained in the polymer segment $A^1$. The non-elastomeric polymer segments $A^2$, line the polymer segment $A^1$, preferably are built up of the monovinyl-aromatic compound alone, and in particular are homopolystyrene. The molecular weight of the polymer blocks $(B\to A^2)$ is preferably from 10,000 to 100,000.

The branched block copolymers of the invention possess high transparency and clarity and good mechanical properties, and in particular are superior, in respect of impact strength and elongation at break, to the conventional products described in German Laid-Open Application DOS 1,959,922. This was not foreseeable, and was all the more surprising since, according to the teaching of DOS 1,959,922, all non-elastomeric polymer segments must be in terminal positions if satisfactory mechanical properties are to be achieved. Hydrogenation can in particular improve the aging resistance of the products, though it may result in some reduction in their transparency. The branched block copolymers of the invention can easily be processed by the conventional processing methods for thermoplastics, eg. extrusion, deep-drawing or injection molding, and may be used, for example, for the manufacture of packaging.

The Examples which follow illustrate the invention. The viscosity number, measured in 0.5% strength solution in toluene at 25° C, is quoted as a measure of the molecular weight. The impact strength $a_n$ and notched impact strength $a_k$ were determined on a molded specimen according to DIN 53,453. The yield stress Y, tensile strength Z and elongation at break D were measured on a compression-molded dumbbell-shaped bar according to DIN 53,455.

EXAMPLE 1

2 kg of toluene and 250 g of styrene were titrated with n-butyl-lithium, in a 6 l pressure kettle under an inert gas atmosphere, with exclusion of moisture, until polymerization commenced. 2.25 mmoles of n-butyl-lithium (as a solution in n-hexane) were then added and the mixture was polymerized at 50° C for about 1.5 hours, until the styrene was virtually completely converted. The resulting polystyrene segments had a viscosity number of 47.2 (cm³/g). A further 6.75 mmoles of n-butyl-lithium (as a solution in n-hexane) were added to the solution of polystyryl-lithium, and a mixture of 125 g of styrene and 125 g of butadiene was then added to the reaction solution. The temperature was kept at from 50° to 55° C. After about 3 hours, polymerization was virtually complete. 2.25 mmoles of silicon tetrachloride were then added as the coupling agent and the reaction solution was kept for 15 hours at room temperature. The polymer was then precipitated from the solution by adding methanol, filtered off and dried.

The branched block copolymer obtained had an average approximate structure of [polystyrene-poly(butadiene/styrene)→polystyrene]$_1$-Si-[polystyrene←poly(butadiene/styrene)]$_3$ and a viscosity number of 76.8 (cm³/g). Its mechanical properties are shown in the table below.

EXAMPLE 2

The procedure followed was as described in Example 1, but in this case 2.4 kg of toluene and 350 g of styrene were initially introduced into the reactor. After titrating the reaction solution with n-butyl-lithium, 4.66 mmoles of n-butyl-lithium were added to initiate the polymerization, which was carried out at 50° C until the styrene was completely converted. The resulting polystryene had a viscosity number of 37.1 (cm³/g). A further 4.66 mmoles of n-butyl-lithium were then added, followed by a mixture of 106 g of styrene and 170 g of butadiene. After completion of the polymerization, coupling was carried out with 23.3 mmoles of silicon tetrachloride. The viscosity number of the end product was 99.9 (cm³/g). The approximate structure of the branched block copolymer was [polystyrene-poly(butadiene/styrene)→polystyrene]$_2$-Si-[polystyrene-poly(butadiene/styrene)]$_2$. The mechanical properties are summarized in the table.

COMPARATIVE EXAMPLE (according to German Laid-Open Application DOS 1,959,922)

2.7 kg of cyclohexane and 600 g of styrene were titrated with sec.-butyl-lithium in a 6 l pressure kettle under an inert gas atmosphere and then polymerized for 30 minutes with 0.33 g of sec.-butyl-lithium. The initial temperature was 54° C. 0.22 kg of cyclohexane, 0.9 g of sec-butyl-lithium and 225 g of styrene were added to the reaction solution at 71° C, polymerization was carried out for one hour, and 250 g of butadiene were then polymerized onto the product in the course of 1 hour at about 74° C. Finally, coupling was carried out with 10 ml of Epoxyl 9-5 in 150 ml of toluene. The product was precipitated from isopropanol. The viscosity number was 91.9 (cm³/g).

TABLE

|  | $a_n$ (cm·kg/cm²) | $a_k$ (cm·kg/cm²) | Y (kp/cm²) | Z (kp/cm²) | D (%) |
|---|---|---|---|---|---|
| Example 1 | 33.5 | 16.8 | 290 | 175 | 410 |
| Example 2 | 30% fracture | 2.5 | 214 | 269 | 431 |
| Comparative Example | 15.1 | 5.4 | 170 | 190 | 91 |

We claim:

1. Branched block copolymers of from 60 to 95 percent by weight of a monovinyl-aromatic compound and from 40 to 5 percent by weight of a conjugated diene of 4 to 8 carbon atoms, which have an average structure of the general formula $$(A^1\text{---}B\rightarrow A^2)_n\text{---}X\text{---}(A^2\leftarrow B)_m$$

where $A^1$ and $A^2$ are non-elastomeric polymer segments based on the monovinyl-aromatic compound and the B's are elastomeric polymer segments based on the conjugated diene, $n$ and $m$ are numbers, $m$ being equal to or greater than $n$ and the sum of $m$ and $n$ being at least 3, and X is the radical of the polyfunctional coupling agent by means of which the linear polymer blocks $(A^1\text{---}B\rightarrow A^2)$ and $(B\rightarrow A^2)$, which form the branches, are chemically bonded to one another at the polymer segments $A^2$, with the provisos that the polymer segment or segments $A^1$ contains or contain from 50 to 80 percent by weight of the total monovinyl-aromatic compound of the branched block copolymer, as copolymerized units, the transition between the polymer segments $A^1$ and B is sharp and the transition between the polymer segments B and $A^2$ is gradual.

2. Branched block copolymers as set forth in claim 1, which have a weight-average molecular weight of from 100,000 to 1,000,000.

3. Branched block copolymers as set forth in claim 1, which are partially or completely hydrogenated.

4. A process for the manufacture of branched block copolymers of claim 1 which comprises: polymerizing in a first stage of the process, from 50 to 80 percent by weight of the total amount of monovinyl-aromatic compound in an inert solvent, in the presence of a relatively small amount of a monolithium-hydrocarbon as the initiator until conversion is virtually complete, thereafter, in a second stage of the process, adding to the reaction solution a further amount of monolithium-hydrocarbon, which is equal to or greater than the amount of initiator originally employed, followed by the addition of a mixture of the remaining monovinyl-aromatic compound and the conjugated diene, and again carrying out the polymerization until the monomers have been virtually completely converted, thereafter subjecting the mixture of the resulting linear block copolymers with active terminal lithium-carbon bonds to a coupling reaction, by adding a polyfunctional coupling agent, to form a branched block copolymer and finally isolating the branched block copolymer from the reaction solution.

5. A branched block copolymer as set forth in claim 1, wherein the monovinyl-aromatic compound is styrene, styrene alkylated in the side chain and nuclear substituted styrene.

6. A branched block copolymer as set forth in claim 1, wherein the conjugated diene is butadiene, isoprene and 2,3-dimethylbutadiene.

7. A branched block copolymer as set forth in claim 1, wherein the polyfunctional coupling agent is a polyepoxide, polyisocyanate, polyketone, polyanhydride, polyhalide, dicarboxylic acid ester, silicon halide or polyvinyl-aromatic.

8. A branched block copolymer as set forth in claim 1, wherein the sum of $n + m$ is from 3 to 10.

9. A process as set forth in claim 4, wherein the amount of initiator in the first stage is from 0.2 to 10 moles per mole of the monovinyl-aromatic compound.

10. A process as set forth in claim 4, wherein the amount of initiator in the second stage is from 1 to 15 times the amount of initiator added in the first stage.

* * * * *